United States Patent Office 3,415,773
Patented Dec. 10, 1968

3,415,773
CEMENTITIOUS COMPOSITIONS
James D. Collins, Indianapolis, Ind., and John F. Corwin, Pittsburgh, Pa., assignors, by direct and mesne assignments, to Industrial Research and Manufacturing, Inc., Indianapolis, Ind., a corporation of Indiana
No Drawing. Filed Sept. 8, 1964, Ser. No. 395,006
6 Claims. (Cl. 260—38)

ABSTRACT OF THE DISCLOSURE

An ultra high-strength concrete composition is provided. The concrete contains a major amount of concrete formed from water, calcium-aluminate cement and mineral aggregate and a minor amount of an in situ-formed cross-linked condensation product of a polyhydric phenol, such as resorcinol, and paraformaldehyde, either as such or in its higher polymerized form. Cementitious mixes made from the composition have a workable time prior to setting up of sufficient length to permit the use of the mix in large scale operations at ordinary temperatures.

---

This invention relates to improved cement-containing compositions. More particularly, this invention relates to ultra high-strength concrete compositions containing a minor amount of a polyhydric phenol-paraformaldehyde condensation product formed in situ during the curing of the concrete.

While ordinary concrete is an eminently satisfactory material for the construction of roads, sidewalks, buildings, floors, and the like, there are certain special situations wherein an improvement in the properties of concrete is desirable, particularly with regard to tensile strength and compressive strength. Furthermore, ordinary concrete crumbles under excessively high temperatures; it is slightly absorbent for water; it is subject to dusting; and is not too resistant to chemical attack. Finally, concrete can be poured at freezing temperatures only with the addition of salt solutions, and the resulting concrete is thereby weakened.

In the copending application of James D. Collins and Edward L. Shriver, Ser. No. 395,058, filed even date herewith now U.S. Patent 3,216,966, there is described an ultra high-strength concrete which is markedly superior to ordinary concrete. The novel concrete is made by admixing 1–10 parts by weight hydraulic cement, preferably portland cement, 3–7 parts by weight mineral aggregate per part hydraulic cement, one part by weight of a polyhydric phenol selected from the group consisting of resorcinol and phloroglucinol, 1.25–3 moles, per mole of polyhydric phenol, of an aldehyde selected from the group consisting of formaldehyde and glyoxal, and sufficient water to hydrate the cement.

The new class of concrete compositions provided by Collins and Shriver represents a significant contribution to the art of specialty concrete manufacture. The extreme rapidity with which these concrete compositions set up and attain high tensile and compressive strength makes them particularly useful in situations where quick repair work is mandatory. For example, in the patching of bridges and roadways where it is undesirable to restrict the flow of traffic for any length of time, the novel compositions will attain adequate strength to permit the passage of traffic thereover in a matter of hours. Unfortunately, the preferred compositions falling within the generic class defined by Collins and Shriver set up within 15 minutes at ordinary temperatures, which limits the use of these compositions to small scale patching and guniting operations or application at freezing temperatures.

We have discovered a novel species within the generic class of compositions that has a workable mixing time, prior to setting up, of up to six hours.

In accordance with the invention there is provided an ultra high-strength concrete composition containing a major amount of a concrete formed from water, calcium-aluminate cement and mineral aggregate and a minor amount of an in situ-formed cross-linked condensation product of a polyhydric phenol, selected from the group consisting of resorcinol and phloroglucinol, and paraformaldehyde, either as such, or in its higher polymerized form; i.e., polyoxymethylene.

The novel concrete compositions of the invention are made by mixing the resin-forming ingredients with the calcium-aluminate cement and mineral aggregate in the dry state and adding sufficient water to give a slurry of the desired consistency and for the hydration of the cement in forming concrete. The calcium-aluminate cement, water, mineral aggregate, and resin-forming ingredients are thoroughly mixed and then poured into forms. The mixing and pouring can be completed in a time ranging between about one-half to six hours, depending upon the form of the paraformaldehyde used in the preparation of the cementitious mixes.

Calcium-aluminate cement is defined by Kirk and Othmer in the Encyclopedia of Chemical Technology, Interscience Publishers, Inc. (1949), volume 3, p. 431, as a hydraulic cement which differs from portland cement in that it contains a much higher percentage of alumina and the active ingredients are compounds of calcium oxide and alumina. The designation "calcium-aluminate cement" is used in the art to distinguish high alumina cements from portland and special cements in which calcium silicates are the principal constituents. Calcium-aluminate cement consists of one or more crystalline phases and an embedding material, which is almost entirely amorphous. The predominantly crystalline phase is monocalcium aluminate. Stable and unstable pentacalcium trialuminate are frequently present, but in smaller amounts. The amorphous material consists primarily of portions of calcium oxide, alumina and silica that have not crystallized.

Calcium-aluminate cement is used for applications wherein a rapid hardening is necessary. It is surprising, particularly in view of the fact that calcium-aluminate cement sets up and hardens more rapidly than portland cement, that calcium-aluminate, when used in combination with resorcinol or phloroglucinol and paraformaldehyde, provides a cementitious composition having a greatly increased working time, in comparison with the preferred compositions within the generic class provided by Collins and Shriver.

The cement useful in the present invention must consist essentially of calcium-aluminate cement. Up to twenty per cent by weight portland cement or other hydraulic cement can be added to the mix without materially reducing the advantageous long setting time obtained through the use of our novel compositions.

The term "mineral aggregate" as used in the above description of the invention means any of the many materials, singly or in combination, which have been used in the past to prepare concrete and their equivalents. Suitable mineral aggregates include sand, gravel, crushed rock, broken concrete, slag, bricks, clinker, etc. Mineral aggregates of particular value for the purposes of this invention include mixtures of sand with pebbles or flints from gravel beds, crushed granite, gneiss, trap, hard sandstone, and other similar materials.

Aldehydes useful in preparing the compositions of the invention are limited to paraformaldehyde or paraformaldehyde in one of its higher polymerized forms, commonly referred to as alpha-polyoxymethylene or beta-polyoxymethylene. The higher polymers of paraformaldehyde are easily prepared by heating paraformaldehyde to a temperature of approximately 100° C., preferably in the presence of an acid catalyst, such as oxalic acid or a Lewis acid. Formalin, when used in combination with calcium-aluminate cement, gives a mix which sets up within 15 minutes at ordinary temperatures. For operations on a larger scale, a set time of 25-30 minutes is a practical minimum. The paraformaldehyde should be added in such a manner that it can be thoroughly contacted with the polyhydric phenol and uniformly dispersed throughout the cement mix to provide a homogeneous distribution of the in situ-formed resin in the final cured product.

Polyhydric phenols useful in the invention are limited to resorcinol and phloroglucinol. Other phenolics, such as phenol, 3,5-xylenol, and catechol, give crumbly products with low compressive strength. Resorcinol, because of its lower cost and great availability, is the preferred polyhydric phenol. The polyhydric phenol and formaldehyde can be pre-reacted to the extent that the pre-reacted product remains completely water-soluble at the time of its introduction to the concrete mix. Thus, various methylolated resorcinols can be used, including water-soluble resorcinol-formaldehyde resins containing up to 0.8 mole of formaldehyde per mole of phenolic body. Resorcinol can also be used in its dimeric, or condensed, form; i.e., trihydroxydiphenyl.

The ratio of paraformaldehyde to polyhydric phenol employed in our novel compositions can vary from about 1.25 moles of paraformaldehyde to about 3 moles of paraformaldehyde per mole of polyhydric phenol. As is well understood in the resin art, the greater the amount of formaldehyde present, the greater the amount of cross-linking to be found in the final product. For some concrete compositions, however, a high degree of cross-linking of the in situ-formed resin is not necessarily desirable. In the preferred compositions we employ about 1.5 to 2 moles of paraformaldehyde for each mole of resorcinol used, inasmuch as the concrete compositions containing resorcinol-formaldehyde resins having these paraformaldehyde/resorcinol ratios have markedly improved properties when compared with those of ordinary concrete.

The amount of resin formed in situ in our novel concrete compositions is based upon the amount of cement phase present and can vary from about one part of resin to from about one to about four parts of cement, all parts being by weight. Ratios of cement to resin in the range of 1:1 to 2:1 are preferable, since the concrete compositions containing these ratios have greatly improved tensile strength and compressive strength. If greater than about four parts cement is used, the mix tends to be too dry to work properly. If less than one part cement is used, the mix becomes too thin and excessive bleeding and separation occurs.

The ratios of cement to mineral aggregate or filler, such as sand, gravel, asbestos, etc., present in the compositions of this invention are those customarily employed in the cement art and vary from one part of cement to three to seven parts of mineral aggregate, depending upon the use to which the concrete is to be put. If greater than seven parts aggregate is used, the strength of the resulting concrete is appreciably diminished.

The water initially added to the dry mixture of calcium-aluminate cement and mineral filler gives a workable slurry which can be poured into forms. As the concrete sets the form, however, this added water hydrates the cement to give the mixture of mineral aggregate and hydrated cement which is known generically as concrete. The amount and uniformity of hydration determines to a large degree the properties of the final concrete, particularly the properties of tensile and compressive strength. The polymerization reaction between the polyhydric phenol and paraformaldehyde, which, if initiated in the cement slurry at the time of mixing, also furnishes water; one molecule of water being given off for each reaction between one paraformaldehyde and two polyhydric phenol molecules. Thus, the polymerization reaction, as it proceeds to completion within the concrete, furnishes added water for the hydration of the hydraulic cement. This internally provided water is distributed more uniformly and efficiently than is possible simply with the use of externally added water. Thus, this molecular hydration made possible by the polymerization reaction between the polyhydric phenol and paraformaldehyde, which takes place within the setting concrete, contributes to the increased strength of the concrete compositions of this invention.

The amount of water added during the mixing of the concrete is not particular critical. The mix must contain sufficient water to make it workable and less than that amount which causes excessive bleeding. Generally, it is convenient to add about 25-50 parts by weight water for each 100 parts by weight of cement plus polyhydric phenol.

Our invention is further illustrated by the following examples:

EXAMPLE I

A concrete with a thirty minute set up time was prepared from the following ingredients (in parts by weight):

| | Parts |
|---|---|
| Sand | 208.5 |
| Calcium-aluminate cement | 58.36 |
| Resorcinol | 26.9 |
| Paraformaldehyde | 14.8 |
| Type 1 portland cement | 11.14 |
| Water | 25 |

The resulting concrete had a greatly increased compressive strength when compared with a similar concrete prepared from the same ingredients, with the omission of the resorcinol and formaldehyde.

EXAMPLE II

A cementitious mixture was prepared containing 60 percent by weight of calcium-aluminate cement, 26.7 percent resorcinol, and 13.3 percent paraformaldehyde. Water in an amount equal to 32 percent by weight of the cementitious material was added. One part of this mixture was added to four parts of sand. The resulting concrete set up in 90 minutes and had a compressive strength of 1850 p.s.i. after four hours. After 26 hours, the compressive strength had increased to 4890 p.s.i.

EXAMPLE III

A cementitious mixture was prepared from 60 parts calcium-aluminate cement, 6 parts type 1 Portland cement, 26.7 parts of resorcinol, and 13.3 parts of paraformaldehyde. 41.8 parts of water were added. Next, one part of the above mixture was added to 3.24 parts of sand and 3.25 parts of ⅜ No. 4 coarse aggregate. The resulting concrete had the following compressive strengths at the stated times: 1 hr.—1330 p.s.i.; 4 hours—2710 p.s.i.; 1 day—3350 p.s.i.; 35 days—3690 p.s.i.; 7 days—3770 p.s.i.; 28 days—6830 p.s.i.; 90 days—10,290 p.s.i.

Cement-resin compositions prepared as set forth in Examples I–III have been used to repair spalled areas of concrete driveways and the materials have also been successfully gunited. These compositions are also useful to prepare floor toppings for areas subjected to attack from acids or alkalis or as motar for brick or a lining for tile or pipe subjected to similar attack.

EXAMPLE IV

A series of experiments were made to determine the effect of using various polyoxymethylenes in lieu of the paraformaldehyde. The degree of reactivity of a particular polyoxymethylene varies with the extent to which the paraformaldehyde is heat polymerized; the higher the degree of polymerization, the lesser the reactivity. In the following series of experiments, the reactivity of untreated paraformaldehyde is rated as one and the reactivity of the two polyoxymethylenes tested is comparative, based on the reactivity of the untreated standard.

Three mixes, identified in the following table as A, B, and C, were prepared containing 6.87 parts by weight resorcinol, 3.77 parts by weight paraformaldehyde or polyoxymethylene, 16.2 parts by weight calcium-aluminate cement, 63.65 parts by weight sand, and 9.28 parts by weight water. The resulting cementitious mixtures had a resorcinol to formaldehyde mole ratio of 1:2, a resin to cement weight ratio of 40:60, and a water to cement plus resorcinol ratio of 40:100. The results are shown in Table I.

TABLE I

| Mix | A | B | C |
| --- | --- | --- | --- |
| Reactivity of paraformaldehyde | 1.0 | 0.58 | 0.38 |
| Exotherm, °C | 41 | 30.5 | None |
| Workable time, minutes | 25 | 165 | 265 |
| Compressive strength, p.s.i., 2″ cubes: | | | |
| 3 hours | 1,960 | 0 | 0 |
| 24 hours | 2,800 | 4,650 | 5,025 |
| 7 days | 3,050 | 3,050 | 3,025 |

It can be seen from Table I that the use of polyoxymethylene in lieu of the untreated paraformaldehyde measurably extends the workable time of the cementitious mix.

Comparative experiments were made substituting portland cement for the calcium-aluminate cement used in the above example. Using untreated paraformaldehyde, the portland cement had a workable time of three minutes. Using polyoxymethylene having a reactivity of 0.22 (considerably less than those used in the above experiments), the workable time was extended only to nine minutes, thus demonstrating that the effect of polyoxymethylene on portland cement is not significant from the practical standpoint.

EXAMPLE V

A mixture was prepared containing 6.87 parts by weight (resin solids) of a soluble resorcinol-formaldehyde resin containing 0.67 mole of formaldehyde per mole of resorcinol, 3.97 parts by weight paraformaldehyde, 6.26 parts by weight calcium-aluminate cement, 63.65 parts by weight Ottowa sand, and 9.25 parts by weight water. The resulting cementitious mix had a resin to formaldehyde mole ratio of 1:2 and a total resin plus formaldehyde to cement weight ratio of 40:60. Two inch cubes of concrete made from the cementitious mix developed the following compressive strengths: 3 hours, 1700 p.s.i.; 24 hours, 1940 p.s.i.; and seven days, 3570 p.s.i.

EXAMPLE VI

A series of experiments were made to determine the effect of varying the total resin to cement weight ratio. Mixtures were prepared having a resorcinol to formaldehyde mole ratio of 1:2 and a water to cement weight ratio of 40:100. The resin to cement ratio was varied from 10:90 to 75:25. The results are shown in Table II.

TABLE II

| Mix | R+F:cement ratio | Temp., °C | Compressive strength, p.s.i., 2″ cube | | |
| --- | --- | --- | --- | --- | --- |
| | | | 3 hrs. | 24 hrs. | 7 days |
| A | 10:90 | 32 | Mix too dry to work properly | | |
| B | 30:70 | 45 | 600 | 2,840 | 3,760 |
| C | 40:60 | 41 | 1,890 | 2,800 | 3,050 |
| D | 50:50 | 75 | 4,025 | 4,350 | 4,680 |
| E | 75:25 | 88 | Mix too thin—heavy bleeding and separation | | |

It is seen from Table II that if the resin to cement ratio is too low, the mix is too dry to work properly and that if the resin to cement ratio is too high, heavy bleeding and separation occurs.

We claim:
1. A cementitious mixture suitable for the preparation of ultra high-strength concrete upon the addition of water comprising 1–4 parts by weight of a cement phase consisting essentially of calcium-aluminate cement, 3–7 parts by weight mineral aggregate per part cement, 1 part by weight of a polyhydric phenol selected from the group consisting of resorcinol and phloroglucinol, and 1.25–3 moles, per mole of polyhydric phenol, of an aldehyde selected from the group consisting of paraformaldehyde, alpha-polyoxymethylene, or beta-polyoxymethylene.

2. An ultra high-strength concrete prepared from 1–4 parts by weight of a cement phase consisting essentially of calcium-aluminate cement, 3–7 parts by weight mineral aggregate per part cement, 1 part by weight of a polyhydric phenol selected from the group consisting of resorcinol and phloroglucinol, 1.25–3 moles, per mole of polyhydric phenol, of an aldehyde selected from the group consisting of paraformaldehyde, alpha-polyoxymethylene, or beta-polyoxymethylene, and sufficient water to hydrate the cement.

3. An ultra high-strength concrete prepared from 1–4 parts by weight of a cement phase consisting essentially of calcium-aluminate cement, 3–7 parts by weight mineral aggregate per part cement, 1 part by weight resorcinol, 1.25–3 moles, per mole of resorcinol, of alpha-polyoxymethylene or beta-polyoxymethylene and sufficient water to hydrate the cement.

4. A composition according to claim 3 wherein the cement phase contains up to 20 percent of portland cement.

5. An ultra high-strength concrete prepared from 1–4 parts by weight calcium-aluminate cement, 3–7 parts by weight mineral aggregate per part calcium-aluminate cement, 1 part by weight resorcinol, 1.25–3 moles alpha-polyoxymethylene or beta-polyoxymethylene and sufficient water to hydrate the cement.

6. An ultra high-strength concrete prepared by admixing 1–2 parts by weight calcium-aluminate cement, 3–7 parts by weight sand per part calcium-aluminate cement, 1 part by weight resorcinol, 1.5–2 moles, per mole resorcinol, of alpha-polyoxymethylene or beta-polyoxymethylene, and from 25–50 parts by weight water for each 100 parts by weight calcium aluminate cement plus resorcinol.

References Cited

UNITED STATES PATENTS 3,216,966  11/1967  Collins et al. _____ 260—38

OTHER REFERENCES

Condensed Chemical Dictionary; 7th edition, Reinhold Publishing Corp., 707, 764.

Encyclopedia of Chemical Technology; vol. 3, 1949, p. 431, Interscience Publishers Inc.

Martin: The Chemistry of Phenolic Resin, John Wiley & Sons, Inc., 1956; p. 111.

Rhodes: "Resorcin Resins and Adhesives," Modern Plastics, vol. 22, December 1944; pp. 160, 161.

ALLAN LIEBERMAN, *Primary Examiner.*

L. T. JACOBS, *Assistant Examiner.*